United States Patent
Polster

[11] Patent Number: 6,035,647
[45] Date of Patent: Mar. 14, 2000

[54] METHOD AND APPARATUS FOR CHILLING IN-SHELL EGGS

[76] Inventor: Louis S. Polster, 2205 Marthas Rd., Alexandria, Va. 22307

[21] Appl. No.: 09/001,673

[22] Filed: Dec. 31, 1997

[51] Int. Cl.[7] .............................. F25D 13/06; A23L 1/32
[52] U.S. Cl. .............................. 62/64; 62/373; 426/298; 426/393
[58] Field of Search .................................. 62/62, 63, 64, 62/373, 374, 375, 376; 426/298, 393

[56] References Cited

U.S. PATENT DOCUMENTS

| | | |
|---|---|---|
| 212,007 | 2/1879 | Inglis et al. . |
| 709,583 | 9/1902 | Schöning . |
| 1,092,897 | 4/1914 | Clairemont . |
| 1,163,873 | 12/1915 | Thornburgh . |
| 1,197,707 | 9/1916 | Bennett . |
| 1,261,724 | 4/1918 | Duke . |
| 1,388,024 | 8/1921 | Clairemont et al. . |
| 1,520,424 | 12/1924 | McCullough . |
| 1,888,415 | 11/1932 | Swenson . |
| 1,922,143 | 8/1933 | Sharp . |
| 1,943,468 | 1/1934 | Bridgeman et al. . |
| 2,001,628 | 5/1935 | Niernick . |
| 2,184,063 | 12/1939 | Meyer et al. . |
| 2,222,000 | 11/1940 | Schmidt . |
| 2,236,773 | 4/1941 | Fischer . |
| 2,337,666 | 12/1943 | Koonz et al. . |
| 2,423,233 | 7/1947 | Funk . |

(List continued on next page.)

FOREIGN PATENT DOCUMENTS

| | | |
|---|---|---|
| 2680951-A1 | 3/1993 | France . |
| 72454 | 4/1953 | Netherlands . |
| 242780 | 11/1925 | United Kingdom . |
| WO 92/21254 | 12/1992 | WIPO . |
| WO 95/12320 | 5/1995 | WIPO . |
| WO 95/14388 | 6/1995 | WIPO . |
| WO 95/18538 | 7/1995 | WIPO . |
| WO 97/07691 | 3/1997 | WIPO . |

OTHER PUBLICATIONS

Database Abstract. AN:78(04):Q0043 FSTA. USSR Patent, 577009. Inventors: Krivopishin et al, (1997).
E.M. Funk, "Pasteurization of Shell Eggs," University of Missouri, College of Agriculture, Agricultural Experiment Station, Research Bulletin 364, pp. 1–28 (May 1943).
M.E. St. Louis, "The Emergence of Grade A Eggs as a Major Source of *Salmonella Enteritidis* Infections," JAMA vol. 259, No. 14, pp. 2103–2107 (Apr. 8, 1988).
E.M. Funk, "Maintenance of Quality in Shell Eggs by Thermostabilization," University of Missouri, College of Agriculture, Agricultural Experiment Station, Research Bulletin 467, pp. 1–46 (Dec. 1950).
Food Industry, vol. p 341, Mar. 1948, p. 71.
E.M. Funk, "Stabilizing Quality in Shell Eggs," University of Missouri, College of Agriculture, Agricultural Experiment Station, Research Bulletin 362, pp. 1–38 (Apr. 1943).
Remington's Pharmaceutical Sciences, 16th Edition, Mack Publishing Co., Easton, PA (1980).
Oliver Products Company, "The Oliver® Aqua–Therm™/Compu–Therm™ Water Convection Oven System," Brochure No. 11134–1–May 1993.

*Primary Examiner*—Christopher B. Kilner
*Attorney, Agent, or Firm*—Oliff & Berridge, PLC

[57] ABSTRACT

A method for chilling a plurality of layers of in-shell eggs includes immersing at least one stack of a plurality of layers of in-shell eggs in cooled liquid until the eggs are cooled to a predetermined temperature or below. A preferred apparatus for conducting the method includes a liquid bath container with chilling heat exchangers and a source of bubbles for vertically perturbating liquid in the container.

25 Claims, 4 Drawing Sheets

U.S. PATENT DOCUMENTS

| | | |
|---|---|---|
| 2,438,168 | 3/1948 | Hearst et al. . |
| 2,439,808 | 4/1948 | Hodson . |
| 2,497,817 | 2/1950 | Hale et al. . |
| 2,565,311 | 8/1951 | Koonz et al. . |
| 2,673,160 | 3/1954 | Feeney et al. . |
| 2,758,935 | 8/1956 | Shaffer . |
| 2,776,214 | 1/1957 | Lloyd et al. . |
| 3,027,734 | 4/1962 | Mills . |
| 3,028,245 | 4/1962 | Mink et al. . |
| 3,046,143 | 7/1962 | Lowe et al. . |
| 3,082,097 | 3/1963 | Haller . |
| 3,113,872 | 12/1963 | Jones et al. . |
| 3,144,342 | 8/1964 | Collier et al. . |
| 3,148,649 | 9/1964 | Moore et al. . |
| 3,321,316 | 5/1967 | De Paolis et al. . |
| 3,364,037 | 1/1968 | Mink et al. . |
| 3,420,790 | 1/1969 | Gassner et al. . |
| 3,440,831 | 4/1969 | Thompson ................................ 62/64 |
| 3,461,680 | 8/1969 | Rische . |
| 3,522,061 | 7/1970 | Whiteford . |
| 3,658,558 | 4/1972 | Rogers et al. . |
| 3,663,233 | 5/1972 | Keszler . |
| 3,831,389 | 8/1974 | Lipona . |
| 3,843,813 | 10/1974 | Driggs . |
| 3,865,965 | 2/1975 | Davis et al. . |
| 3,882,686 | 5/1975 | Rose . |
| 4,045,579 | 8/1977 | Rogers . |
| 4,157,650 | 6/1979 | Guibert . |
| 4,302,142 | 11/1981 | Kuhl et al. . |
| 4,362,094 | 12/1982 | Polster . |
| 4,503,320 | 3/1985 | Polster . |
| 4,524,082 | 6/1985 | Liot . |
| 4,524,083 | 6/1985 | Liot . |
| 4,537,208 | 8/1985 | Kuhl . |
| 4,558,661 | 12/1985 | Theilig et al. . |
| 4,666,722 | 5/1987 | Creed et al. . |
| 4,702,777 | 10/1987 | Kuhl . |
| 4,808,425 | 2/1989 | Swartzel et al. . |
| 4,999,471 | 3/1991 | Guarneri et al. . |
| 5,179,265 | 1/1993 | Sheridan et al. . |
| 5,283,072 | 2/1994 | Cox et al. . |
| 5,290,583 | 3/1994 | Reznik et al. . |
| 5,431,939 | 7/1995 | Cox et al. . |
| 5,445,062 | 8/1995 | Polster . |
| 5,474,794 | 12/1995 | Anderson et al. . |
| 5,494,687 | 2/1996 | Polster . |
| 5,589,211 | 12/1996 | Cox et al. . |
| 5,694,836 | 12/1997 | Blevins ................................ 62/63 X |

METHOD AND APPARATUS FOR CHILLING IN-SHELL EGGS

BACKGROUND OF THE INVENTION

The present invention is directed to methods and apparatus for chilling in-shell eggs.

Ordinarily, in-shell eggs are collected from the henhouse, washed, graded and separated according to their grading (e.g., S, M, L, XL, Jumbo and the like). Thereafter, optionally, the eggs may be pasteurized to achieve a 3 to 5 log or more reduction in the count of various microorganisms, such as *Salmonella enteritidis*, associated with in-shell eggs. Whether pasteurized or not, it is necessary to chill the in-shell eggs in connection with their storage and transport to comply with U.S. Department of Agriculture/Food and Drug Administration (USDA/FDA) requirements. Such eggs should be chilled to a temperature, for example, from about 41° F. to about 45° F.

Chilling commercial quantities of in-shell eggs in a refrigeration unit is a slow process. Typically, the refrigeration unit contains chilled air. Without being bound by theory, it is believed that due to the "insulating" properties of air (i.e., poor ability to transfer heat away from, for example, in-shell eggs), it takes 9–10 days or more to chill commercial quantities of in-shell eggs (e.g., 270 or more dozen eggs at a time provided in stack(s) of a plurality of layers of in-shell eggs) in a refrigerator. Because of the slow nature of the refrigeration process, conventional means for chilling eggs are very expensive. During refrigeration, the eggs have to be stored in expensive refrigerated warehouses for extended periods of time. In addition, the prolonged chilling times increase handling costs and reduce the freshness of the eggs.

With respect to optionally pasteurized eggs, chilling may be used to stop further pasteurization thereof. Alternatively (or in addition), eggs may be chilled without pasteurization. Either way, chilling slows down the growth rate of various microorganisms (e.g., pathogenic and non-pathogenic bacteria such as rot bacteria) that are typically present both on the shell and inside the shell of a whole egg, including within the egg albumin and within the egg yolk. Further, chilling also slows down loss of functionality of the eggs.

With regard to pathogens present on and/or inside an in-shell egg, especially a chicken egg, a common pathogen is Salmonella. A variety of other microorganisms may also be present on and/or within in-shell chicken eggs. See E. M. Funk, Pasteurization of Shell Eggs, University of Missouri, College of Agriculture, Agricultural Experiment Station, Research Bulletin 364, pp. 1–28 (May 1943), incorporated herein by reference in its entirety.

While the following comments are directed to chicken eggs, these comments also apply to other types of in-shell eggs.

In the early 1900's, it was appreciated that chicken eggs were pathogenically contaminated on their outer shell. Such contamination was believed to be caused by surface contact with, for example, fecal matter, contaminated animal feed, other contaminated material and the like. It was further believed that in-shell eggs were contaminated within the egg shell by penetration of pathogens through the checks or cracks thereof. It was recognized that microorganisms may enter the pores of an in-shell egg, especially when being chilled in cold water. Further, it has only recently been discovered that bacteria such as Salmonella and, especially, *Salmonella enteritidis*, enters the egg yolk of an in-shell egg via trans-ovarian transmission (i.e., from the mother to the egg even before the egg is laid by the hen). See M. E. St. Louis et al., The Emergence of Grade A Eggs as a Major Source of *Salmonella enteritidis* Infections, Journal of the American Medical Association, Vol. 259, No. 14, pp. 2103–2107 (Apr. 8, 1988), incorporated herein by reference in its entirety.

As noted, chilling is used to slow down the growth rate of the various microorganisms that may be present within and/or on in-shell eggs. Chilling may also be used to halt further pasteurization or cooking of eggs once a desired level of pasteurization or cooking has been achieved.

The ability to rapidly chill large numbers of in-shell eggs may be critical to pasteurizing eggs without substantially impairing egg functionality. This is because eggs are typically pasteurized by heating them to a desired temperature range for a desired time. See co-pending Davidson International Application No. PCT/US96/13006 (U.S. application Ser. No. 08/519,184), incorporated herein by reference in its entirety. See also, International Application No. PCT/US95/00254 (WO 95/18538), and U.S. Pat. No. 2,423,233, each incorporated herein by reference in its entirety.

Without rapid chilling of these eggs, they slowly cool towards room temperature. However, the slow cooling may result in the eggs spending too much time at an elevated temperature, causing substantial impairment of egg functionality.

Typically, large volume commercial operations involve transporting one or more batches of, for example, several hundred to thousands of dozens of eggs (e.g., 1,000 to 6,000 dozen eggs) at a time. However, often times such large commercial quantities of in-shell eggs cannot be rapidly chilled together as a single batch sufficient to prevent substantial impairment of egg functionality (e.g., at least about 60 Haugh units per batch) using known refrigeration techniques. Thus, for commercial size operations, in order to halt further pasteurization and avoid substantial impairment of egg functionality, and/or to slow the growth rate of microorganisms associated with in-shell eggs there is a need to rapidly chill a large number of in-shell eggs.

When chilling commercial quantities of in-shell eggs, the ability to maintain their market quality is critically important. For example, the market quality of pasteurized chilled eggs or unpasteurized chilled eggs should be sufficient to market them to the public (for consumption). Thus, chilling of in-shell eggs (with or without prior pasteurization) in a cost efficient manner is paramount, especially for large scale commercial operations to remain efficient, cost-effective and successful. There is, therefore, a need to provide methods and apparatus for rapidly and cost effectively chilling commercial quantities of in-shell eggs.

SUMMARY OF THE INVENTION

In embodiments of the invention, a process for chilling in-shell eggs comprises immersing at least one stack of a plurality of layers of eggs into at least one cooled liquid until the eggs are cooled to a predetermined temperature by dissipating heat from the eggs to the liquid.

The above-noted process may be carried out, for example, in an apparatus for chilling in-shell eggs comprising a container for holding a liquid bath; a heat exchanger adapted to cool liquid in the bath to a predetermined temperature; and a source of bubbles of at least one gas sufficient to provide vertical perturbation of the liquid.

DETAILED DESCRIPTION OF PREFERRED EMBODIMENTS

Figure 1A:
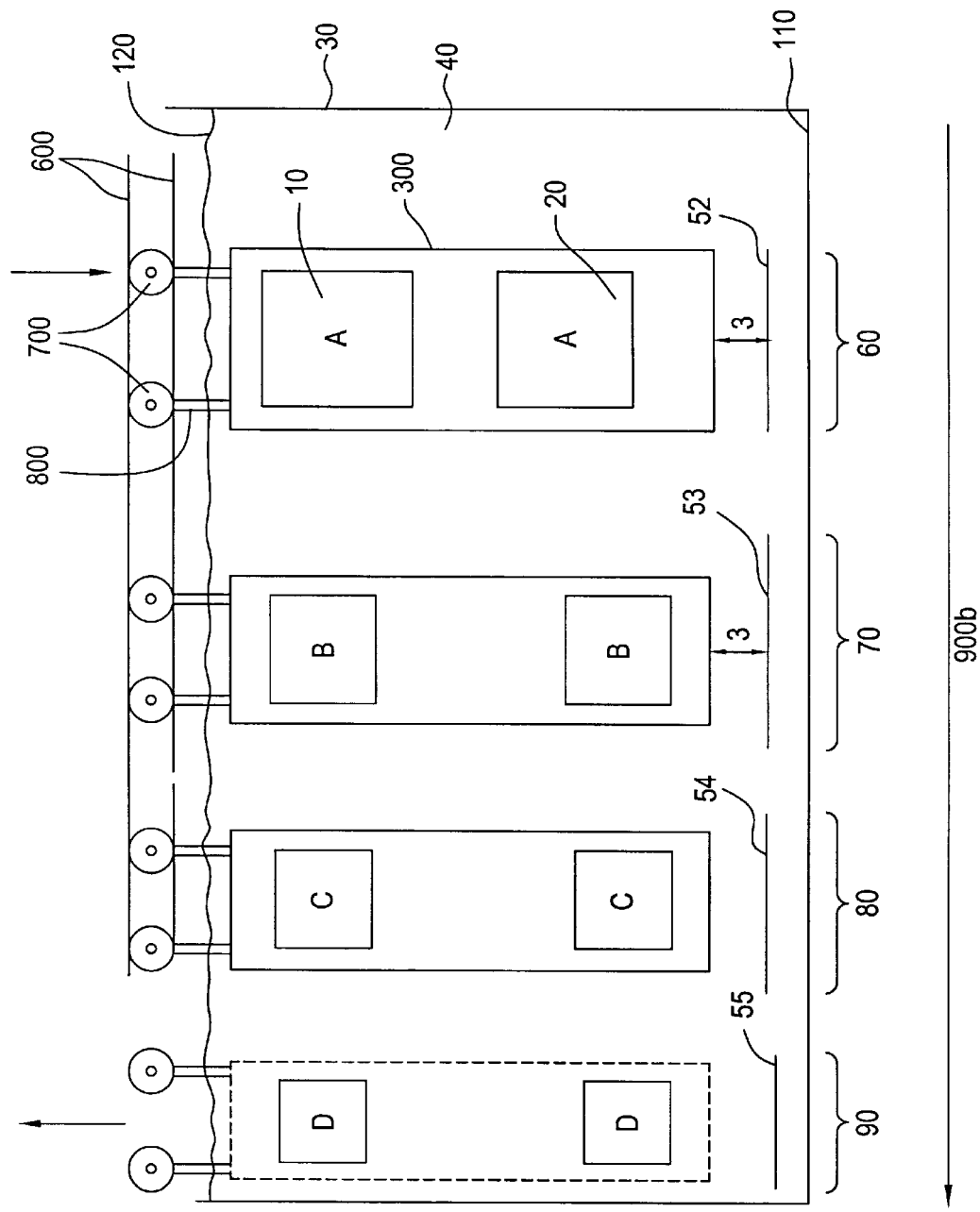
FIG. 1A schematically represents one embodiment of the claimed process.

In commercial operations, it is not efficient or cost-effective to chill a single egg, a single row or even a single layer of in-shell eggs at a time. To the contrary, in a competitive market, it is most desirable to chill at least one batch of several, tens, hundreds, or thousands of dozens of eggs together.

To handle large batches of in-shell eggs for transportation or the like, these in-shell eggs may be provided in a plurality of layers formed into stacks. The stacks most standard in the industry contain about 6 layers of in-shell eggs per stack (or multiples thereof, e.g., 12, 18, 24, 30, 36, etc.). Further, each layer of in-shell eggs may contain about 30 in-shell eggs (or multiples thereof, e.g., 60, 90, 120, 150, 180, etc.). When a plurality of these layers of in-shell eggs are formed into one or more stacks, the stacks contain in-shell eggs located at their periphery extending all the way to their center. Conveniently, each layer of eggs is held in a 6 egg by 5 egg flat. Sometimes, such flats may not all be fully filled with 30 eggs; however, incompletely filled flats add to the cost and inefficiency of the process.

As previously noted, refrigeration of stacks of in-shell eggs is slow, inefficient, expensive and undesirable. One reason for the inefficiency is that refrigeration is accomplished by placing the stack(s) of in-shell eggs in a refrigeration unit. Therein, the eggs are surrounded by chilled air. Because air is a poor conductor of heat, heat slowly dissipates from the eggs to the chilled air and away from the eggs. The stack(s) of eggs typically require from about 9–10 or more days of chilling time to achieve a chilling temperature, for example, of about 40–45° F. Without being bound by theory, it is believed that the chilling inefficiency inherent to refrigeration is at least partly due to the poor thermal conductivity of air.

A further problem that has prevented rapid chilling of at least one stack of a plurality of egg layers is that the in-shell eggs within a stack nearest the periphery of the stack would chill much faster than the eggs located in the center of the stack. Without being bound by theory, it is believed that the eggs nearer the periphery would trap air in the stack and thus insulate the eggs in the center of the stack. Thus, for example, the result would be that (1) the in-shell eggs nearest the periphery are properly chilled while the in-shell eggs nearest the center are insufficiently chilled; or (2) for those eggs that are optionally pasteurized, the in-shell eggs nearest the periphery are sufficiently chilled but the in-shell eggs nearest the center have their functionality substantially impaired from staying too long at a high temperature. Other such undesirable combinations of improper chilling and/or impaired functionality could also be encountered.

Thus, the peripheral eggs of the stack would have chilled faster than eggs centrally located in the stack. As a result, a disparity in temperature of the eggs in the stack would become more and more pronounced as the stack and/or batch size increases. This disparity would have become even more dramatic when the size of the eggs, the size of the layers (i.e., number of eggs per layer), the number of layers per stack and/or the number of stacks being chilled together in one or more batches of a plurality of stacks are increased.

It is preferred that the chilling cycle for a single batch (e.g., one or more stacks of 5 dozen to 6,000 or more dozen eggs per batch) is several hours or less, preferably from several minutes to about 1 hour and, more preferably, under about 15 minutes, for example from about 5 minutes to about 10 minutes.

According to the invention, it has surprisingly been discovered that at least one stack of a plurality of layers of in-shell eggs can be rapidly, efficiently and cost-effectively chilled at the periphery (or at locations nearest a heat exchanger), at locations farthest away from the heat exchanger, and in the interior (all the way to the center) of the stack.

Figure 1B:
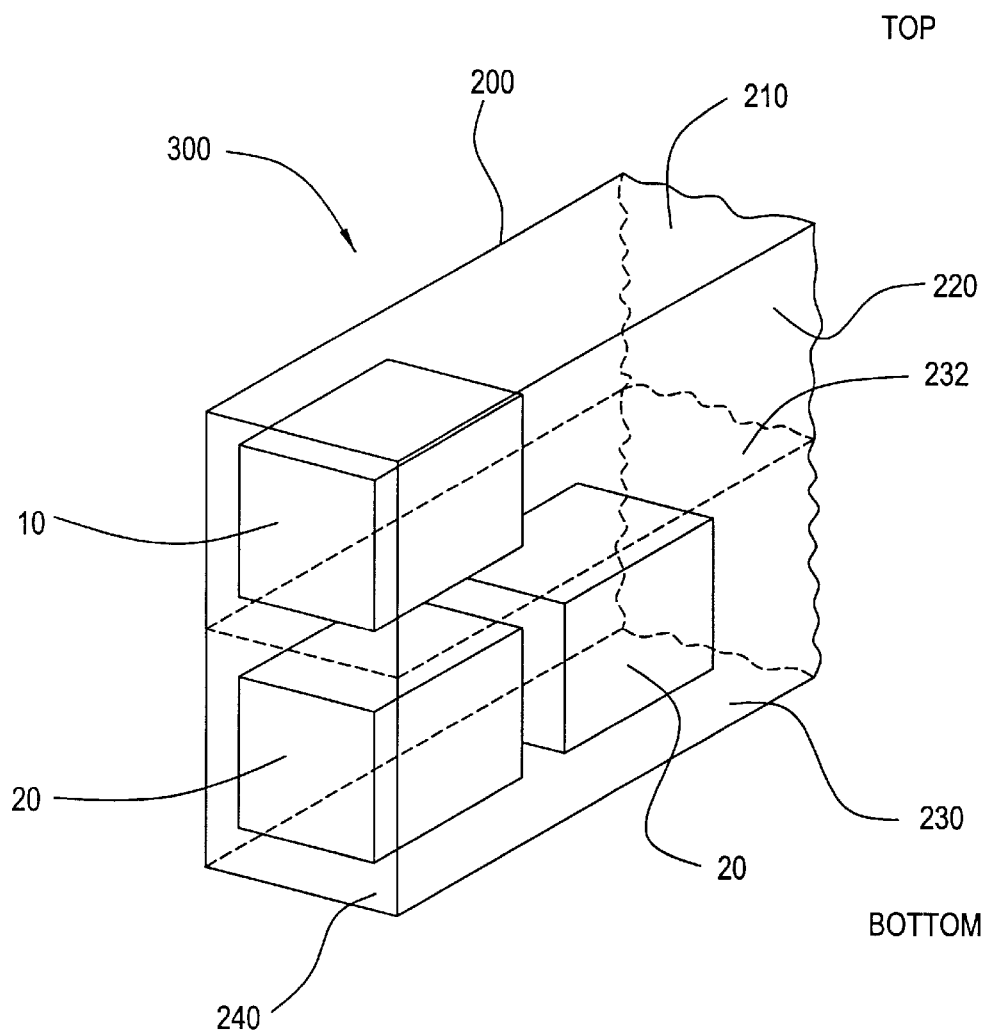
FIG. 1B schematically depicts a perspective view of one embodiment of carrier for use with the present invention.

In FIG. 1A, stacks 10 and 20 of six layers (1a, 1b, 1c, 1d, 1e and 1f; see FIG. 1E) of in-shell eggs 5 in a plurality of flats (2a, 2b, 2c, 2d, 2e, 2f and 2g; see FIG. 1E) are shown. Instead of top flat 2a, a wire mesh cover or the like may be used. Further, a plurality of stacks 10 and 20 is depicted. At various stages of the chilling process, these stacks are immersed in liquid 40, which may be contained in bath 30. While only one bath 30 is shown, a plurality of baths may be used. More particularly, the stacks (10 and 20) are lowered into a receiving zone 60 of bath 30. Further, in accordance with various stages of the chilling process as shown in FIG. 1A, the eggs in the stacks are enveloped by chilled liquid 40 contained in baths 30.

The desired precision to which the eggs are chilled may be provided by a combination of several elements. These elements may include, but are not limited to, at least one heat exchanger, at least one temperature sensor, at least one means for perturbating fluid in the bath(s) sufficient to substantially uniformly chill each of the eggs in the stack, preferably by vertical perturbation, and one or more flats for holding the eggs and allowing perturbation of the fluid around the entire surface of each egg held therein. U.S. Pat. No. 4,503,320 (Polster), incorporated herein by reference in its entirety, describes an exemplary temperature sensor and temperature control system suitable for use in conjunction with the present invention. See also Patent Cooperation Treaty application no. PCT/US94/12790 (WO 95/12320), incorporated herein by reference in its entirety. However, heat exchangers may be located in other portions of the bath, outside the bath, or may even be eliminated if the liquid is obtained from a cold enough source.

According to the embodiment of FIG. 1A, a plurality of temperature sensors may be placed throughout bath 30. Preferably, at least two sensors per zone (e.g., 60, 70, 80, and/or 9) are provided. These sensors are preferably spaced substantially vertically apart sufficient to accurately monitor the temperature of liquid 40. These sensors are also connected to the control system. The temperature sensors and the control system may thus be used to maintain the cooling temperature sufficient to rapidly chill the stack(s) of in-shell eggs. If the eggs have been previously pasteurized, then, preferably, chilling the eggs should be sufficiently rapid to prevent substantial impairment of their functionality.

A means for perturbating the fluid next to, between and around the in-shell eggs in the stacks (e.g., stacks 10 and 20) is preferably provided. The perturbation is preferably provided in a vertical direction emanating from below and being directed upwards towards and through the layers of in-shell eggs. The perturbation should be sufficient to substantially perturbate the fluid around the entire surface of each egg held in the stack(s). A preferred means for vertically perturbating a liquid surrounding the in-shell eggs held in one or more stacks of flats comprises flowing bubbles of at least one gas, such as $CO_2(g)$, $Ar(g)$, air or the like through liquid 40. Air is, of course, inexpensive, abundant and safe for handling.

Preferably, the gas is provided through a gas supply line. Preferably, the gas line outlet(s) are located at or near the bottom 110 of bath 30. For example, the gas line outlet(s) may be located at level 110. Further, the gas line outlet(s) are preferably located between and/or below the heat exchangers 52, 53, 54, and/or 55 depicted in FIG. 1A. As the gas is released, bubbles of the gas rise through liquid 40, through carrier 300, through stacks 10 and 20, through flats 2a–2g, around the entire surface of each egg, to the surface 120 of liquid 40. The bubbles on their way to the surface 120 help to equalize the temperature of liquid 40 and thus the temperature of eggs in the stacks immersed in liquid 40.

In embodiments, the supply of bubbles to perturbate the fluid around the entire surface of each in-shell egg in one or more stacks may be provided by a regenerative blower. Preferably, the regenerative blower will have a capacity (e.g., measured in cubic feet per minute (CFM)) at least equal to about the surface area (e.g., measured in square feet) of the fluid being perturbated in the bath(s). For example, for a surface area at surface 120 of about 100 square feet, the blower should have a capacity of generating at least about 100 CFM of gas.

Figure 1C:
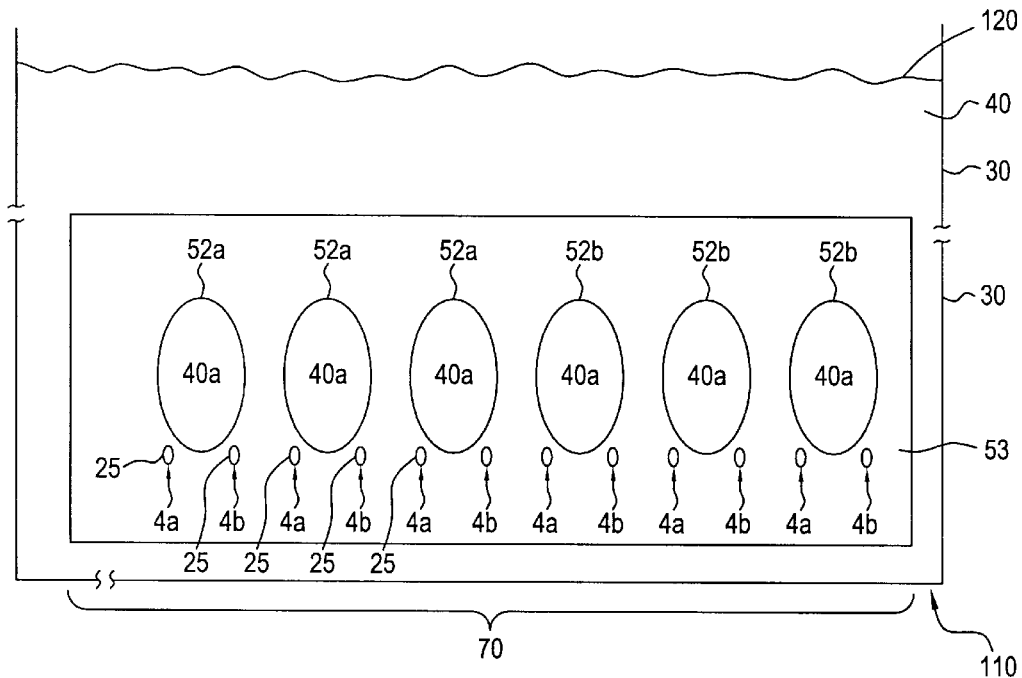
FIG. 1C depicts a cross-sectional view of one embodiment of a heat exchanger for use in accordance with the present invention.
Figure 1D:
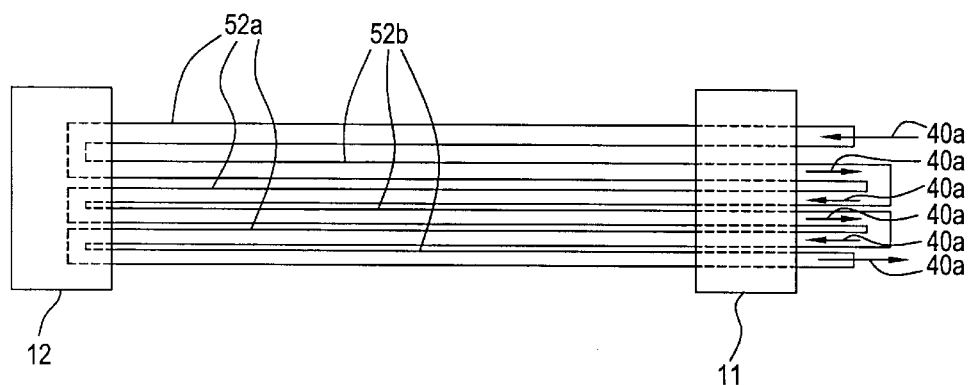
FIG. 1D is a top view of the heat exchanger of FIG. 1C.
Figure 1E:
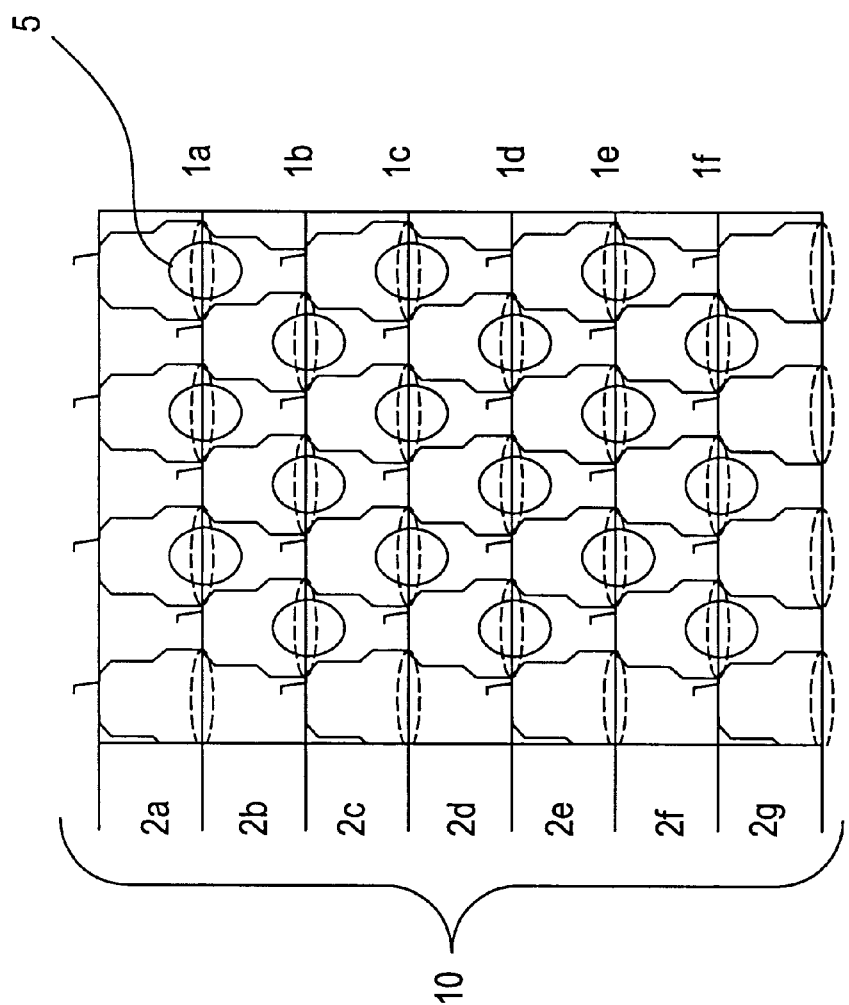
FIG. 1E depicts a stack of a plurality of layers of in-shell eggs.

Now referring to FIGS. 1C and 1D, heat exchanging coils or tubes 52a and 52b may form one or more loops having heat exchange fluid 40a flowing therein. Additionally, in FIG. 1C, cross-sections of sets of gas tubes 4a and 4b are depicted. These gas tubes 4a and 4b provide a source of bubbles of gas 25 flowing therein and being released into the bath. Preferably, the gas tubes are located below or adjacent to chilling tubes 52a and/or 52b. However, configurations other than that depicted in FIGS. 1C and 1D may also be used. Such other configurations should be sufficient to perturbate and thereby uniformly chill liquid 40. It should also be sufficient to perturbate the fluid along the entire surface of each egg and thereby ensure uniform chilling of the eggs in the stacks.

When a plurality of baths is used, appropriate conveyor means for transporting one or more stacks of eggs between the various zones contained therein are provided. Preferably, however, a single bath may be used. According to the embodiment of FIG. 1A, eggs are preferably received in a batch of stacks of 15 dozen eggs per stack or the like. Preferably, each stack comprises about 2, 3, 4, 5, 6 or more perforated flats (e.g., perforated trays described in greater detail below for holding at least one layer of eggs per flat) of 6, 12, 24 to 30 or more in-shell eggs or the like per flat. In embodiments, eighteen stacks of eggs may be placed, for example in two rows of nine stacks per row, on a carrier 300. See FIG. 1B. This carrier is preferably compatible with standard egg handling equipment used in the egg industry.

Carrier 300 preferably has, for example, mounts represented by the combination of wheels 700 and extensions 800 shown in FIG. 1A. Other types and configurations of mounts or other conveying, loading and unloading means may suitably be used with the present invention as will be readily understood by one of ordinary skill in the art. Therefore, while too numerous to list, such mounts and such other loading, unloading and/or conveying means and conveying systems are useful in the present invention. The exemplary mounts (comprising wheels 700 and extensions 800 in FIG. 1A) permit the loader/unloader to load and unload the stacks in and out of liquid 40 as well as transport the stacks laterally from one zone to another as desired. The mounts, if any, should preferably allow continuous and/or discontinuous (e.g., intermittent) lateral movement of the stacks of eggs enveloped by liquid 40 as well as movement of the stacks in and out of liquid 40. Alternatively, the stacks may simply be lowered into liquid 40 until sufficiently chilled and then taken out of liquid 40 without any lateral movement of the stacks.

As depicted in FIG. 1B, carrier 300 may be of a rectangular or square shape; however, any shape sufficient to hold one or more stacks may be used. Further, carrier 300 may be provided with one or more intermediate shelves such as shelf 232 for supporting one or more rows of stacks such as 10 and 20. Further, some or all of the faces of carrier 300 should be sufficiently perforated (i.e., open or permeable) to permit liquid 40 to readily enter into carrier 300 and to pass through all the stacks and layers and to envelope all the eggs contained therein. Also, carrier 300 should be sufficiently open to ensure adequate perturbation, preferably vertical perturbation, of the liquid over the entire surface of all the eggs to ensure uniform cooling of all the eggs. For example, at least faces 210 and 230 and shelf 232 may be formed from a wire mesh or some other open structure sufficient to allow liquid 40 to envelope all the eggs and yet strong enough to support the weight of the stacks whether in or out of liquid 40. In addition, carrier 300 is preferably formed of a material that can be reused and that does not interfere with the process, apparatus, and flats of the present invention.

One or more carriers 300 may be used. For example, one carrier for each batch A, B, C and D may be provided in the embodiment of FIG. 1A. Further, while each carrier is depicted as holding two rows of stacks, any number of one or more rows, one or more stacks and one or more batches may be chilled together in one chilling cycle.

Preferably, the egg carrier 300 is strong enough to hold at least about 270 dozen eggs while being loaded, unloaded or otherwise moved by the material handling system. In addition, it is preferred that the carrier 300 be compatible with standard egg loading, unloading and moving equipment used in the egg industry. It is preferred that the carrier 300 have a shape and a size such that it rests in a stable position when placed on a substantially horizontal surface—i.e., the carrier 300 should not readily tip over either when empty or when filled with stacks of eggs.

It is also preferred that carrier 300 be heavy enough to overcome the buoyancy of the perforated flats and eggs forming the stacks contained therein. Preferably, the weight of the carrier 300 should be sufficient such that it will not float out of its carrier track as it moves through a bath. The carrier 300 should preferably also maintain the stacks contained therein in a relatively secure fashion such that the stacks can be readily loaded and unloaded into the carrier 300 and the carrier 300 can be readily moved vertically and/or laterally through the bath(s) without tipping, breaking or otherwise damaging the in-shell eggs.

Examples of a suitable liquid 40 include water, including salt water, and the like. The liquid may also comprise a mixture of liquids, an emulsion, a dispersion, a suspension or the like. The liquid may contain one or more preservatives or other additives, so long as it is compatible for use with chilling of in-shell eggs for edible consumption. It is preferred that the liquid 40 be substantially non-volatile at the chilling bath temperature, and at ambient temperature and pressure.

Referring to FIG. 1A, bath 30 may, for example, contain a chilled liquid 40 such as water. In the bath, it is possible to provide several, for example, six or more zones per bath (e.g., zones 60, 70, 80, and/or 90 as depicted in FIG. 1A). Further, it can be helpful to provide additional lateral space in the bath. It is of course understood that the minimum width of each zone can be dictated by the size of the carrier 300 to be used. Further, the minimum height of each bath can also be determined by the height of carrier 300 and the space required between the top and bottom rows of stacks of eggs contained therein. Additional space may also be provided above the height of the carrier 300 immersed in liquid 40. This additional height can accommodate the further addition of liquid 40 to the bath(s).

While various zones are depicted in the embodiment of FIG. 1A, it is understood that the bath 30 may only contain one zone into which the eggs to be chilled are immersed and removed therefrom after appropriate chilling is achieved. In other words, though lateral movement of the eggs through the various zones is depicted in FIG. 1A (see arrow 900b), lateral movement is optional. However the eggs are moved, it is preferred that the eggs be immersed in liquid 40 sufficiently to rapidly chill all (or substantially all) of the eggs in a batch thereof to the desired or necessary temperature, for example a temperature required by the USDA/FDA.

In addition, it is preferred that the bath be of a sufficient size to allow complete immersion therein of one or more carriers 300 (fully loaded with one or more stacks of eggs) without spilling liquid 40 from the bath. Preferably, the bath contains a drain and a drain system to allow removal of liquid 40 from the bath as necessary. It is also preferred that space be provided between each carrier and any heat exchangers provided within the bath.

The bath of FIG. 1A contains liquid 40 which is chilled by exemplary heat exchangers (e.g., 52, 53, 54, and 55). These heat exchangers may, for example comprise metallic or other heat conductive material in the form of tubing, preferably formed to maximize the transfer of heat from liquid 40 of the bath to fluid 40a flowing therein. Heat exchangers 52–55 may be placed near the bottom and/or sides of the bath. Alternatively, the heat exchangers may be situated at other locations of the bath sufficient to rapidly and uniformly chill the batch of in-shell eggs immersed in liquid 40. Other configurations may also be used. These configurations should be sufficient to rapidly and uniformly chill the batch of in-shell eggs immersed in liquid 40. One example of tubes forming the heat exchangers is shown in FIGS. 1C and 1D.

Typically, the initial temperature of the stack(s) of eggs being lowered into the receiving zone 60 is from about 70° F. to about 140° F., for example from about 75° F. to about 138° F., from about 90° F. to about 138° F., or from about 110° F. to about 138° F. However, the in-shell eggs may be warmer or cooler. Thus, the chilling time may vary. During chilling, these eggs preferably release a sufficient amount of energy into liquid 40 to lower the yolk temperature of substantially all the eggs to 110° F. or lower, for example to a range from about 35° F. to about 110° F., preferably below 50° F. (e.g. from about 40° F. to about 50° F.), more preferably below 45° F. (e.g. from about 41° F. to about 45° F.) and even more preferably below 42° F.

The chilling time may vary depending upon such factors as the type of eggs, the number of eggs per layer, the size of the eggs in each layer, the number of layers, the number of stack(s), and the initial egg temperature.

Typically, the chilling time for all the stacks is from about 3 minutes to about 20 minutes, for example from about 6 minutes to about 12 minutes or about 9 minutes to about 12 minutes for chilling about 270 dozen eggs contained in at least one batch of about eighteen stacks of 6 layers per stack, each layer containing about 30 in-shell eggs. For example, it takes about 6 minutes to chill eggs from about 137° F. to about 80° F. using about 60° F water. Likewise, for example, it takes about 18 minutes to chill eggs from about 137° F. to about 40° F. using 35° F. water. These eggs may or may not be pasteurized.

For a water containing bath, exemplary bath temperatures (for chilling unpasteurized eggs or for chilling pasteurized eggs while maintaining substantially unimpaired egg functionality) are from about 35° F. to about 75° F. Even more preferably, the desired bath temperature to which all the eggs occupying the various zones of the bath are chilled is from about 33° F.±2° F. to about 70°±2° F. Even more preferably, the desired bath temperature is from about 35° F.±1° F. to about 37° F.±1° F. The precision of the bath temperature may be loosely or tightly controlled. Examples of temperature precision include, but are not limited to, about ±4° F., about ±3° F., about ±2° F., about ±1° F., about ±0.1° F. and about ±0.03° F.

A plurality of heat exchangers (such as 52, 53, 54, and/or 55) per zone (e.g., 60, 70, 80, and/or 90) may be provided in liquid 40. Preferably, if a plurality of heat exchangers is provided per zone, then the heat exchangers may be substantially equally spaced apart. However, the heat exchangers should be located to advantageously maintain the desired liquid temperature substantially uniformly throughout the bath. In addition to heat exchangers, at least one temperature sensor is preferably connected to the bath 30.

Ordinarily, the first zone 70, intermediate zone(s) 80, and/or exit zone 90 are provided with at least one heat exchanger. Optionally, the receiving zone 60 is also provided with at least one heat exchanger (e.g. 52). The heat exchangers are preferably disposed adjacent to and below the lowest stack (e.g., stack 20) and separated by a distance 3. Distance 3 depends, for example, upon the chilling capacity of heat exchangers such as 52, 53, 54, and 55. Distance 3 should be sufficient to allow chilling of all eggs provided within all stacks of at least one batch (e.g., batch A of stacks 10 and 20 depicted in FIG. 1A) in one chilling cycle.

While the receiving zone 60, the first zone 70, the optional intermediate zone 80 and the exit zone 90 are depicted as part of a single bath 30 in FIG. 1A, some or all of these various zones may each comprise a separate bath. In addition, while these zones are discretely represented in FIG. 1A, the zone boundaries (not shown) can be contracted or expanded to accommodate the size of the eggs, the size of the batch, the type of egg (e.g., chicken egg versus other types of eggs), the level of chilling desired, the bath temperatures, and the like. Thus, for example, zone 60 and the other zones may be narrower or wider depending on at least the above-noted factors, and may even be combined into a single area of a single bath.

In FIG. 1A, each of the zones 60, 70, 80, and 90 is depicted with one heat exchanger 52, 53, 54, and 55 per zone, respectively. While FIG. 1A depicts an embodiment of the invention, the number and location of zones, heat exchangers and temperature sensors, means for perturbation of liquid 40 and the like may be varied so that the rapid chilling of one or more stacks of a plurality of layers of in-shell eggs can be accomplished.

Thus, for example, for chilling 350 stacks of in-shell eggs containing 6 layers per stack of 30 in-shell eggs per layer, the total chilling cycle time may, in embodiments, be from about 2 minutes to about 3 hours, preferably, under 2 hours, and more preferably, well under 1 hour (e.g., from about 6 minutes to about 20 minutes).

Preferably, when all of the liquid 40 in the zones (e.g., 60, 70, 80, and/or 90) is appropriately chilled, the system is ready to receive a batch of one of more stacks of eggs. Thus, a loader or a material handling system (MHS) engages a loaded carrier 300 for transport. See FIG. 1B for a depiction of an exemplary carrier 300 filled with a plurality of stacks of eggs. The loader then lowers carrier 300 into receiving zone 60.

Then, referring to FIG. 1A, the conveyor 600 may move the eggs from zone 60 to zone 70 in, for example, bath 30. Further, in general, conveyor 600 may be used to move eggs from one zone to any one of the other zones of a single or multiple baths.

In FIG. 1A, dashed lines outlining carrier 300 loaded with batch D indicate the position of batch D immediately before its removal from bath 30. In general, arrow 900b (FIG. 1A) indicates the overall direction of movement of a single batch through the apparatus of FIG. 1A. It is noted that movement in the direction of arrow 900b is optional and may be continuous or intermittent (i.e., discontinuous) or some combination thereof.

The loader may be configured to load batch A into liquid 40 and unload batch D out of liquid 40. While such a loader or its motion in and out of liquid 40 is not shown, it is imputed herein and is readily understood by one of ordinary skill in the art of moving in-shell eggs, especially chicken eggs and the like.

Typically, the movement of stacks of eggs from one zone to another is accomplished sequentially and/or simultaneously. If transferred sequentially, any of the stacks of eggs in the exit zone 90 are removed first, then eggs nearest the exit zone (e.g., zone 80) are transferred to the exit zone 90 and so on until eggs from the receiving zone 60 are transferred to the first zone 70.

By the time the eggs have been finally removed from exit zone 90, that batch of eggs has been sufficiently chilled in a substantially uniform and rapid manner to a safe storage and/or transportation temperature to avoid growth of pathogens (associated with the eggs) to an unacceptable level for human consumption.

The chilling cycle represents the time from the moment the stacks are enveloped by the chilled liquid until the eggs are finally removed from the chilled liquid for the last time.

During a single complete chilling cycle of at least one batch of stacked layers of in-shell eggs, the temperature of the egg albumin, egg yolk and the intact shell should be sufficiently lowered to maintain the eggs suitable for prolonged storage and subsequent consumption.

During chilling of in-shell eggs, the in-shell egg contents are cooled and thus contract. As a result, if the pores of an in-shell egg are not encapsulated (e.g., in a wax shell) or are not otherwise sealed (e.g., with wax), then during chilling, the chilling liquid and other surrounding materials (e.g., including, but not limited to, pathogens, other micoroorganisms, other contaminants, other chemicals and the like) may be sucked into the in-shell egg through its pores.

Further, Applicants have observed that in-shell eggs readily shed surface liquid (e.g., water and the like) and dry more quickly, if waxed. Alternatively stated, waxed in-shell eggs dry faster than un-waxed in-shell eggs after exposure to a cool chilling liquid. Thus, prior to chilling, the in-shell eggs may optionally be waxed to form an external wax coating around the egg and/or to seal the pores of the in-shell egg. See simultaneously filed co-pending U.S. patent application Ser. No. 09/001,674 (WPB 39609), incorporated herein by reference in its entirety. Further, the waxing of in-shell eggs may be accomplished immediately after or concurrently with pasteurization thereof. See simultaneously filed U.S. patent application Ser. No. 09/002,244 (WPB 39608) and Ser. No. 09/001,677 (WPB 39611), incorporated herein by reference in their entirety, for a description of exemplary pasteurization procedures and equipment.

What is claimed is:

1. A process for chilling in-shell eggs, comprising immersing at least one stack of a plurality of layers of said eggs into at least one cooled liquid until said eggs are cooled to a predetermined temperature by dissipating heat from said eggs to said liquid, wherein said liquid is vertically perturbated by introducing bubbles of gas into an area of said liquid below said immersed eggs.

2. The process of claim 1, wherein said liquid is vertically perturbated to substantially equalize a temperature of said liquid.

3. The apparatus of claim 1, wherein said predetermined temperature is at least about 33° F.

4. The process of claim 1, wherein said bubbles perturbate said fluid along substantially an entire surface of shells of each of said eggs.

5. The process of claim 1, wherein said at least one stack comprises at least 6 said layers.

6. The process of claim 2, wherein said at least one stack comprises at least 12 said layers.

7. The process of claim 5, wherein each of said layers comprises at least 24 said eggs.

8. The process of claim 6, wherein each of said layers comprises at least 24 said eggs.

9. The process of claim 1, wherein all of said eggs are substantially uniformly cooled to said predetermined temperature without cracking shells of any of said eggs.

10. The process of claim 9, wherein said predetermined temperature is below 50° F.

11. The process of claim 10, wherein said predetermined temperature is below 45° F.

12. The process of claim 11, wherein said predetermined temperature is below 42° F.

13. The process of claim 1, wherein said plurality of layers of said eggs are held in a plurality of flats, each flat holding at least one layer of said eggs in cooperation with another vertically adjacent flat.

14. The process of claim 13, wherein said flats are stacked to form at least one cavity for loosely holding said eggs in said egg layers.

15. The process of claim 14, wherein said vertical perturbation is provided by introducing said bubbles through said flats, through said layers of said eggs and around an entire surface of each of said eggs.

16. The process of claim 15, wherein said stacked flats form a plurality of cavities configured to allow said bubbles to propagate through said cavities, through said egg layers and along the entire surface of said eggs in said cavities, and wherein each cavity is sufficient to loosely hold one egg.

17. The process of claim 1, wherein said eggs are at a pasteurization temperature, and wherein said chilling process stops further pasteurization of said eggs.

18. The process of claim 17, wherein pores of shells of said eggs are sealed with wax adhesively sealed to said shells before said eggs are immersed in said liquid.

19. The process of claim 1, wherein pores of shells of said eggs are sealed before said eggs are chilled.

20. The process of claim 19, wherein said pores are sealed with wax adhesively sealed to said shells.

21. The process of claim 1, wherein said eggs are immersed in said liquid following washing and grading of said eggs and before refrigerated storage or shipping of said eggs.

22. The apparatus of claim 1, wherein said at least one stack of a plurality of layers of said eggs is immersed in said at least one cooled liquid for one hour or less.

23. An apparatus for cooling in-shell eggs comprising:
- a container for holding a liquid bath;
- a heat exchanger adapted to cool liquid in said bath to a predetermined temperature below 50° F.; and
- a source of bubbles of at least one gas at a lower portion of said bath to provide vertical perturbation of said liquid;

wherein said container is configured to hold at least one stack of a plurality of layers of eggs in said liquid bath.

24. The apparatus of claim 23, wherein said liquid is water and said predetermined temperature is below 45° F.

25. The apparatus of claim 23, wherein said source of bubbles is below a location of a bottom of said stack and is adapted to cause said bubbles to vertically perturbate said liquid along an entire surface of shells of each of said eggs.

* * * * *